UNITED STATES PATENT OFFICE.

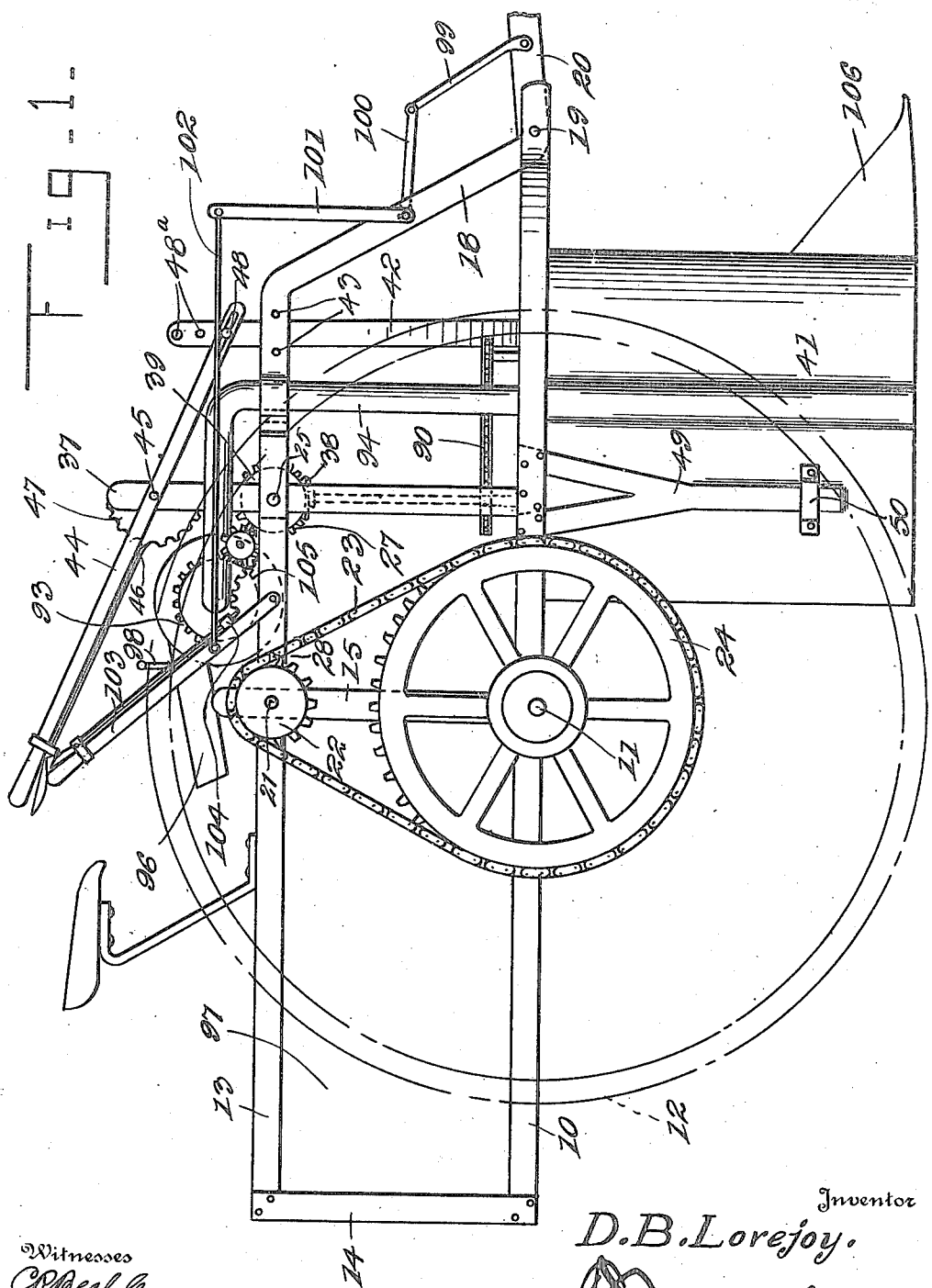

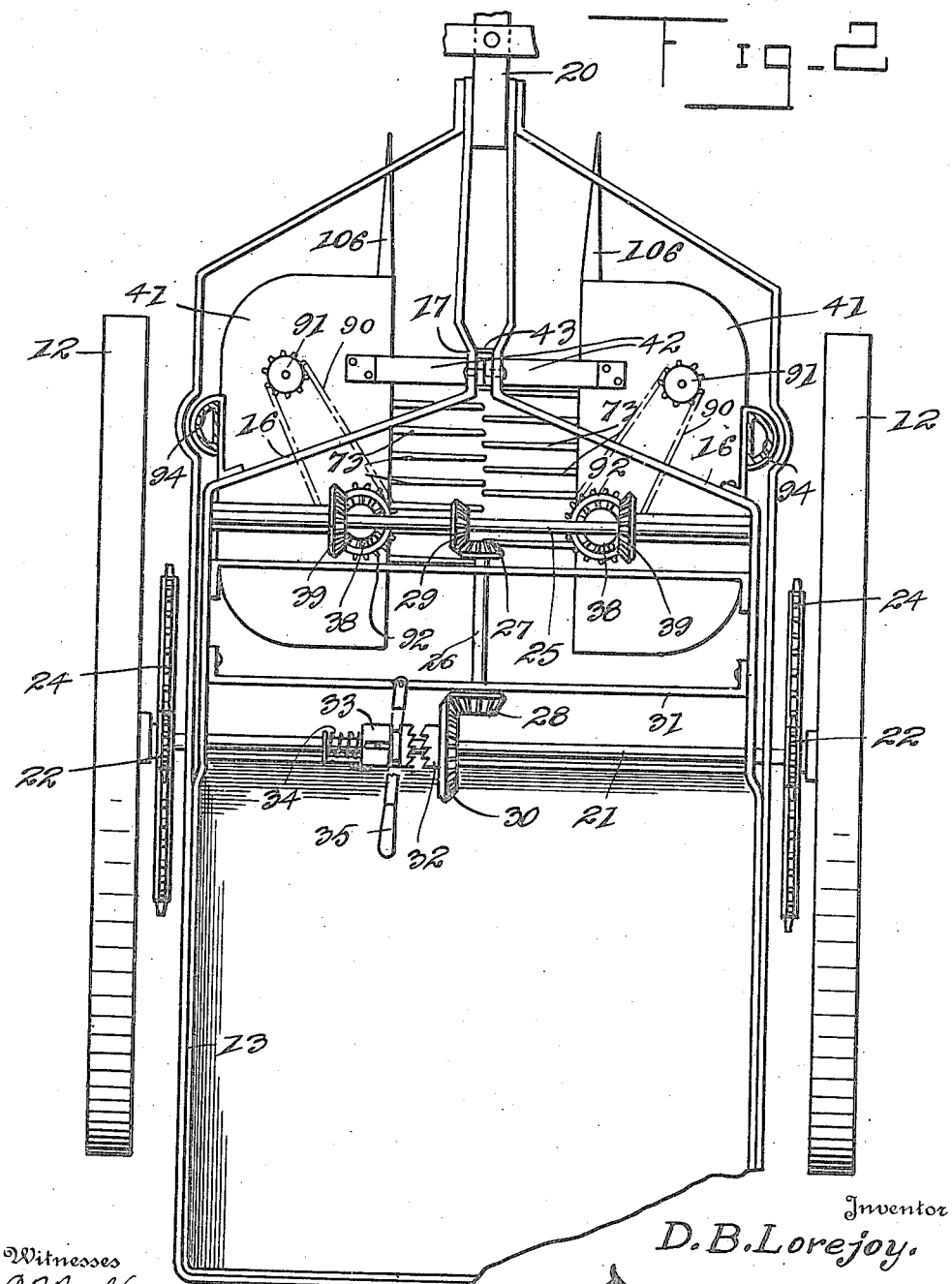

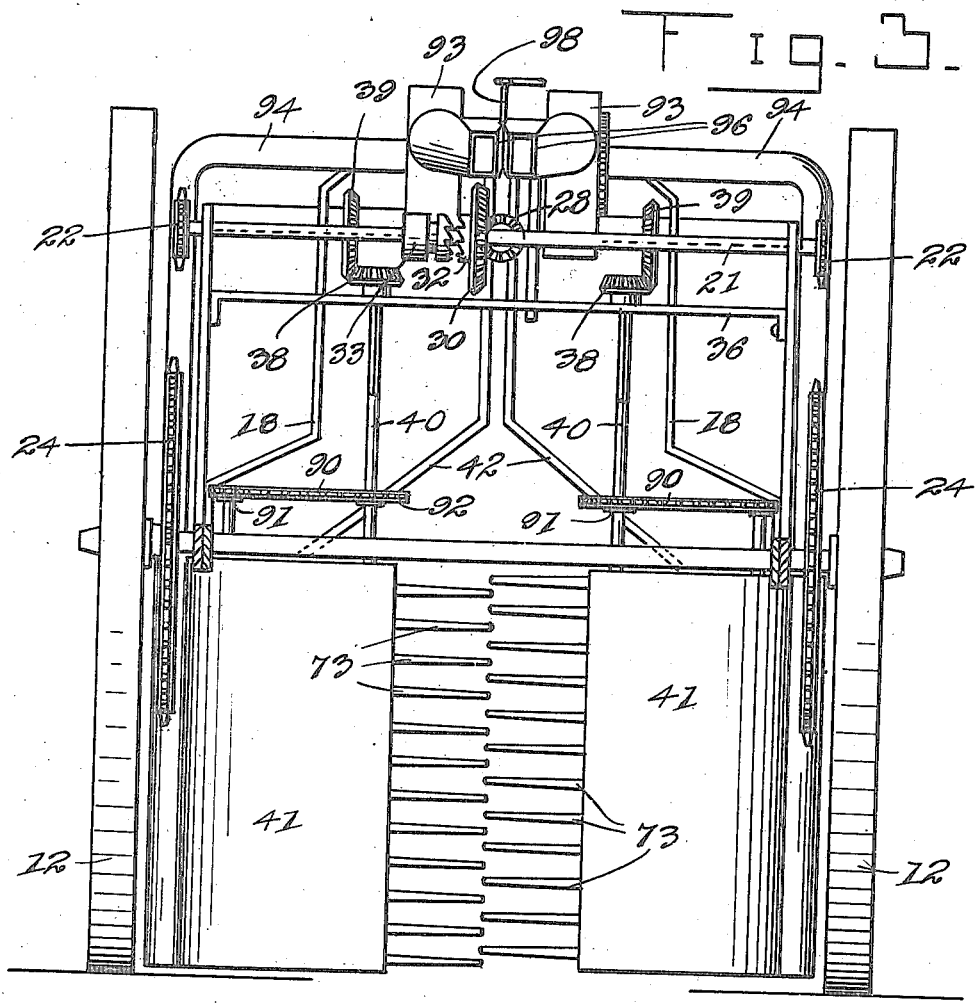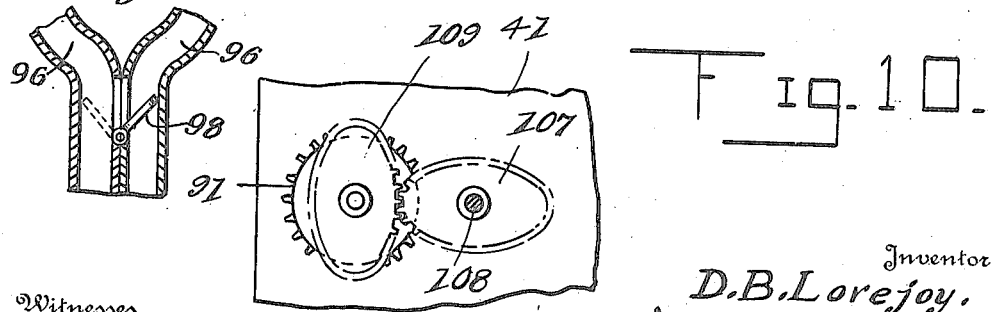

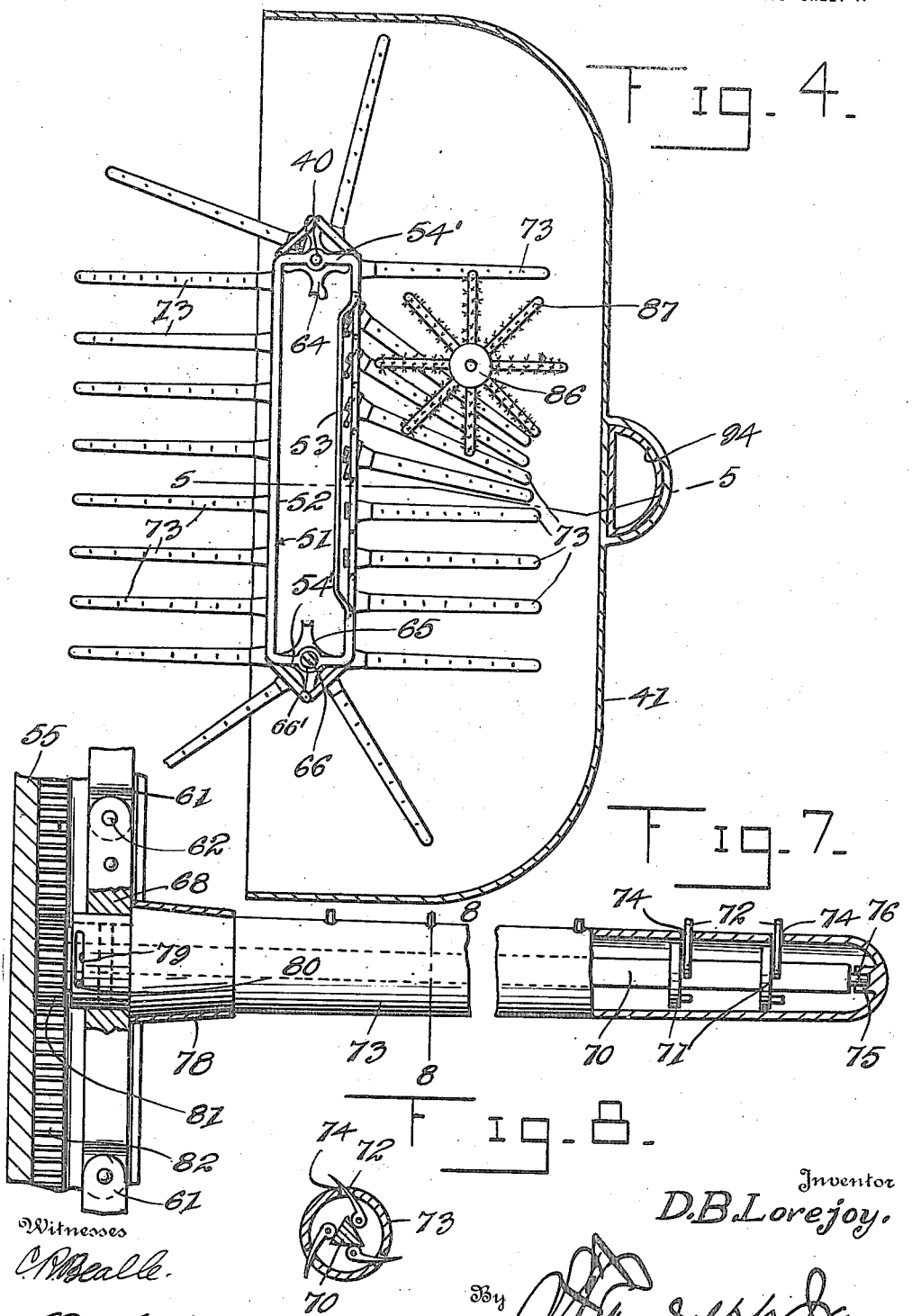

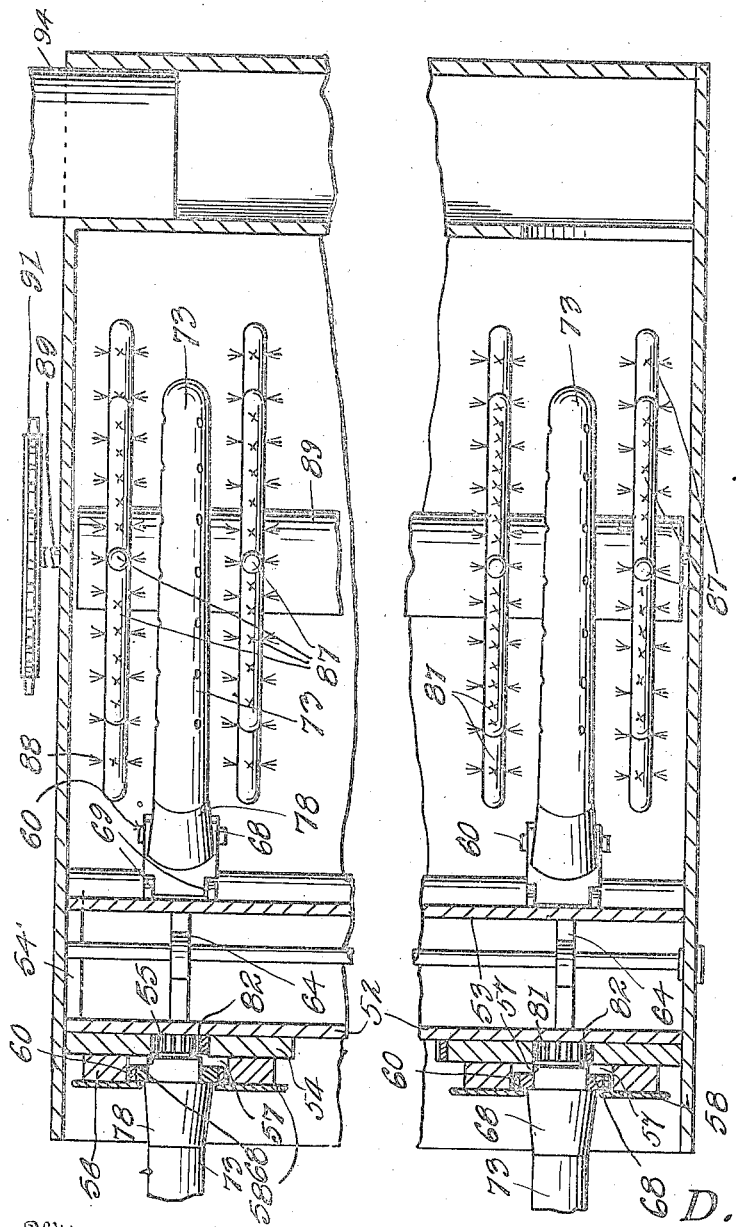

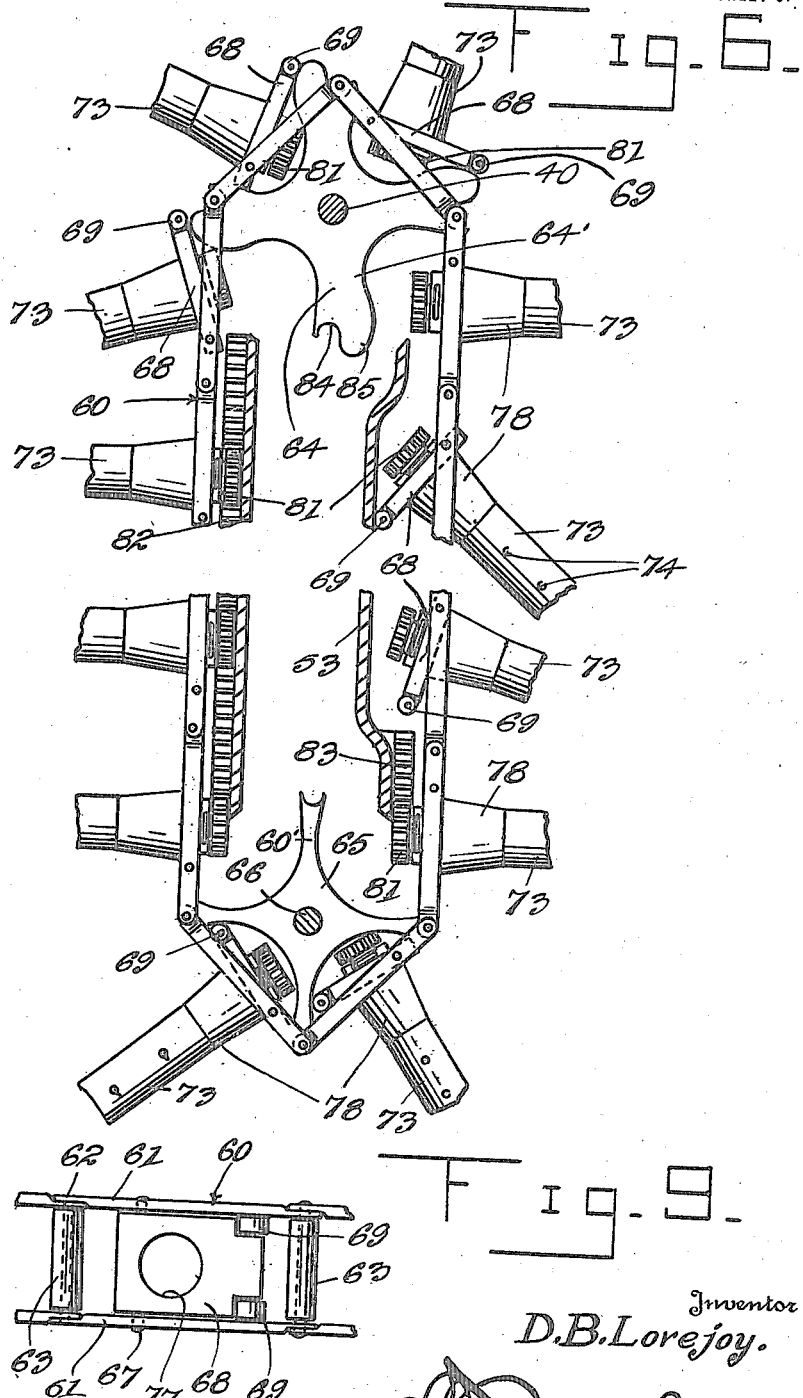

DANIEL B. LOVEJOY, OF PURMELA, TEXAS.

COTTON-HARVESTER.

1,208,591. Specification of Letters Patent. Patented Dec. 12, 1916.

Application filed June 16, 1914. Serial No. 845,399.

*To all whom it may concern:*

Be it known that I, DANIEL B. LOVEJOY, a citizen of the United States, residing at Purmela, in the county of Coryell and State of Texas, have invented certain new and useful Improvements in Cotton-Harvesters; and I do hereby declare the following to be a full, clear, and exact description of the invention, such as will enable others skilled in the art to which it appertains to make and use the same.

The primary object of this invention is to provide a cotton harvester or picker having peculiarly constructed picker arms arranged in series, each series being carried by an endless chain and each arm comprising a rotatable spindle carrying a plurality of curved teeth which may be protruded through openings in a sleeve surrounding the spindle and also retracted into the sleeve.

Another object of the present invention is to provide novel means for connecting the picker arms to the endless chain and novelly formed sprockets or spiders for propelling and supporting the same, so that the arms are drawn into the picking cases and projected therefrom with somewhat of an end thrust, whereby they will come from and enter the cotton plant very easily.

A further object of the invention is to provide picker mechanism mounted within movable casings and means whereby said casings may be very easily raised and lowered.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a side elevation of my improved cotton harvester with the near drive wheel removed and the other drive wheel shown by dotted lines, Fig. 2 is a top plan view of the machine, Fig. 3 is a rear elevation partly in section, Fig. 4 is a horizontal sectional view through one of the picking casings with the picker mechanism shown in plan, Fig. 5 is a fragmentary vertical sectional view taken on the plane of line 5—5 of Fig. 4, Fig. 6 is an enlarged fragmentary horizontal sectional view through a guide frame mounted within one of the picking casings, the picker arm being partly broken away, Fig. 7 is a fragmentary detail view partly in section, showing one of the picker arms and the rotating means therefor, Fig. 8 is a transverse section taken on the plane of line 8—8 of Fig. 7, Fig. 9 is a detail view, showing a portion of one of the endless chains and a picker arm plate pivoted within one of the links of the chain, and Fig. 10 is a fragmentary view, illustrating the manner in which elliptical gearing is used for driving the endless chains. Fig. 11 is a detail sectional view showing the valve for regulating the flow of the cotton.

Referring in detail to the drawings by numerals, 10 designates the main frame which is mounted upon a live axle 11 supported by the drive wheels 12, said wheels being connected to the axle by conventional pawl and ratchet gearing, not shown. A supplemental frame 13 is supported above the main frame by uprights 14 and 15, and upon reference to Fig. 2 it will be seen that the side bars of the supplemental frame 13 extend inwardly and forwardly adjacent the forward end of the frame to form the end bars 16. The opposed ends of the bars 16 terminate in spaced relation to each other and the metal forming the same is then extended forwardly to provide the parallel portions 17 and then extended downward and forwardly, as indicated by the numeral 18, and connected to the forward end of the main frame. A pin 19 connects the two frames to a tongue 20.

The gearing, which drives the picker mechanisms to be described later, includes a main transverse drive shaft 21 journaled through the side bars of the supplemental frame 13 directly over the axle 11. Sprocket gears 22 are rigidly secured to the extremities of the drive shaft 21 and are connected by chains 23 to large sprocket wheels 24 rigidly secured to the axle 11. A supplemental drive shaft 25 is journaled through the side bars of the supplemental frame 13 in advance of the shaft 21 and is driven from said last mentioned shaft by means of a longitudinally extending shaft 26 carrying beveled gears 27 and 28 on its forward and rear ends respectively. The gear 27 meshes with a gear 29 on the shaft 25 and the gear 28 meshes with a similar gear 30 loosely mounted to the shaft 21. Cross bars 31 support the shaft 26. The gear 30 carries a clutch member 32 which may be engaged by a clutch member 33 slidable upon the shaft 21 and connected thereto by a pin and slot connection. A spring 34 holds the clutch member 33 normally in engagement with the clutch member 32, but this engagement may be broken by a shift lever 35 pivoted at its forward end to a cross bar 31.

A cross bar 36 is supported directly under the supplemental drive shaft 25 by uprights 37, said uprights being connected to the main frame and to the supplemental frame. This last mentioned cross bar supports a pair of beveled gears 38 which mesh with similar gears 39 rigidly secured to the shaft 25. Vertical drive shafts 40, for the picker mechanisms, extend downwardly from the gears 38 through the cross bar 36 and project into the picking casings 41. The upper end portions of these shafts are squared and slide through corresponding openings formed in the gears 38. These casings are substantially rectangular in horizontal cross section and have their inner opposed sides entirely open. They are arranged on opposite sides of the vertical longitudinal center plane of the machine and are supported by arms 42, one arm being connected to the top of each casing. The arms extend inwardly until they meet one another and are then extended upwardly between the parallel portions 17 of the supplemental frame 13. Pins 43 connect the parallel portions 17 and act as stops to prevent a movement of the arms 42 longitudinally of the machine.

The arms 42 are hung from a lever 44 pivoted intermediate its ends on a cross rod 45 supported by the upper ends of the uprights 37. An ordinary dog mechanism 46 is carried by the lever 44 and engages a stationary semi-circular rack 47 to hold the lever 44 in any adjusted position. The forward end of this lever is slotted to receive a pin 48 which is adapted for extending transversely through openings 48ª formed in the arms 42 adjacent their upper ends, as clearly shown in Fig. 1. The casings 41 are guided in their vertical movement by Y-shaped depending arms 49 supported by the main frame 10 and extending through yokes 50 secured to the outer sides of the casings.

The picker mechanisms carried by the casings 41 will now be described, and as both sets of mechanism are similar, the description of one will suffice to a clear understanding of the invention.

Referring particularly to Fig. 4, 51 designates, as an entirety, a guide frame arranged within the casing 41 adjacent the open side thereof and running longitudinally of the casing. This guide casing or frame comprises side walls 52 and 53 connected by cross bars 54'. The wall 52 supports a plurality of horizontal bars or strips 54 which are spaced from each other to form longitudinal channels 55 and these strips in turn support additional strips or bars 56 which are spaced to form somewhat wider channels 57. Plates 58 are connected to the outer faces of the bars 56 and form a partial closure for the outer side of the channels 57. The central portion of the wall 53 is offset from the plane of the end portions, as shown in Fig. 4, so as to bring said central portion closer to the center of the machine for a purpose to be hereinafter explained. A plurality of endless chains 60 of the sprocket type run around the guide frame 51 and the inner leads of these chains travel through the channels 57 and each chain is formed by two lines of spaced links 61 connected by pivot pins 62, each pivot pin being provided with a roller 63 which reduces friction as the chains are in motion. At the forward end of the guide frame 51, the chains run around sprocket wheels or spiders 64 rigidly secured to the drive shaft 40 and at the rear end of the frame 51 the chains run over spiders 65 secured to a shaft 66 which is supported by bearings 66' formed upon the frame 51. Between the bars 61, forming each link of the chain 60, is pivoted, by means of vertical pivot pins or trunnions 67, a picker arm supporting plate 68, which has its rear corners cut away to receive anti-friction rollers 69, as shown in Fig. 9.

Each of the plates 68 supports a picker arm which includes a spindle 70, triangular in cross section, as shown in Fig. 8, and provided with a plurality of spaced collars 71 to which are pivoted the pins 72. A sleeve 73 surrounds the spindle 70 and is formed with a plurality of openings 74 through which the pins 72 work. The outer end of the sleeve 73 is provided with an internal bearing 75 in which fits the reduced extremity 76 of the spindle 70 and the inner end of the sleeve extends through an opening 77 formed in the plate 68. A hollow frusto-conical bearing 78 is rigidly secured to the outer face of the plate 68 and rotatably supports the sleeve. The inner end of the sleeve is provided with a circumferential slot 79 through which a pin 80, carried by the spindle 70, projects, whereby said spindle is allowed a limited rotational movement in either direction without affecting the sleeve 73. A pinion 81 is rigidly secured to the extreme inner end of the spindle 70 and meshes with a stationary rack 82 mounted in the bottom of the channels 55, so that, as the picker arm is moved along the wall 52 of the guide frame 51, the spindle will be rotated sufficiently for projecting the pins 72 through the openings 74 into a cotton engaging position, after which the rotation of the spindle independent of the casing 73 is arrested by the pin 80, and the pin 72 remains in a cotton picking position until the spindles are rotated in a reverse direction. To provide for a reverse rotation of the spindles 70 so that the pins 72 will be drawn into the sleeve 73 after the picker arms have moved from engagement with the cotton plant into the casings 41, I provide a short rack 83 supported by the wall 53 adjacent the rear edge thereof and so arranged as to engage the pinion 81 on their top edge. When the rotation of the spindles 70 is reversed, the pins 80 travel the full length of the slot 79 before the sleeves 73 begin a reversed rotation, and it is this movement of the spindles, while the sleeves remain stationary, that causes the pins 72 to be retracted.

One of the objects of the invention, as before stated, is to have the picker arms withdraw easily from among the cotton plants and to enter the plants substantially end foremost, and these features are accomplished by the peculiar construction of the spiders 64 and 65. The spokes 60' of the spider 65 have their extremities recessed to catch the rollers 63 of the pivot pins 62 and so carry the chain around the bend as the picker arms move into the casings 41. It will be noted, upon reference to Fig. 6, that the plates 68 may swing inwardly a slight distance to throw them out of alinement with their respective links as they are passing around the spider 65. It is this inward swing of the rear ends of the plates 68 which causes the picker arms to move from among the foliage with somewhat of a longitudinal movement.

The spokes 64' of the spider 64 are provided adjacent their extremities with grooves or recesses 84 which receive the rollers 63. These grooves are somewhat nearer the hub of the spider than are the extreme ends of the spokes 85 so that, when the rollers 63 are engaged in the grooves 84, the end portions 85 of the spokes 64' project through the links of the chain and throw the rear ends of the plates 68 outwardly which causes the picker arms to enter the foliage end foremost. When the picker arms pass out of the casings 41, the plates 68 move into the channels 57 and are held therein by means of the plates 58, so it will be evident that these arms when operating on the cotton project at right angles to the wall 52 of the guide frame 51.

To provide for stripping the cotton from the picker arms, I employ a plurality of brushes each consisting of a hub 86 and a plurality of radial arms 87 having tufts of brush material 88. These brushes are secured to a vertical shaft 89 journaled through the casing 41 between the guide frame 51 and the outer wall of the casing, and the shaft is rotated by a chain 90 running around gears 91 and 92, the former being secured to the shaft 89 and the latter being secured to the drive shaft 40. Upon reference to Fig. 4, it will be noted that the picker arms, when coming in engagement with the brushes, swing rearwardly, such a movement being permitted by having the central portion of the wall 53 of the guide frame offset as before described.

The cotton is sucked from the casing 41 by rotary fans 93, which fans are connected to the casing by pipes 94. These pipes extend forwardly and downwardly from the fan casings into the casing 41 through the tops thereof and fit loosely in said casings to permit them to be raised and lowered. From the fan casings 93 the cotton is discharged through spouts 96 into any desired receptacle which may be positioned in the body 94 of the vehicle. A valve 98 is employed to shift the flow of cotton from one of the spouts to the other so that, when one receptacle has been filled, the cotton may be directed into another without any pause in the picking operation.

It is often desirable to tilt the machine to throw the picker arms from a horizontal plane into a plane inclined to the horizontal plane, and this I accomplish by varying the angle between the tongue 20 and the main frame 10. The tongue is provided with an arm 99 which is pivotally connected to an arm 100 actuated by the lever 101. The upper end of this lever is connected by a rod 102 to a lever 103, which may be locked in any desired position by a catch 104 engaging a rack 105.

In operation the machine is driven so that the casings 41 pass on opposite sides of a row of cotton plants and the plants are fed properly between the casings by the fenders or guards 106. As the picker arms pass from the casings, they enter the foliage with an end thrust and are rotated by having the pinions 81 engage the top of the rack 82; the direction of rotation is such as to project the pins 72 through the openings 74 and the cotton collects on said pins. When the picker arms round the spiders 65 they come into engagement with the underside of the short racks 83 so that the direction of rotation of the spindles 70 is reversed, causing the pins 72 to be drawn into the sleeves 73. As the arms pass between the brushes, they are wiped clean of cotton and as before stated this cotton is sucked through the pipes 94 and discharged into suitable receptacles supported in the body 97. If it is desired to have the endless chains travel at a constantly changing speed, elliptical gearing, such as illustrated in Fig. 10, may be employed. Here the gear 107 is secured to a shaft 108 which drives the spiders 64 and meshes with a gear 109 on the drive shaft 40. This arrangement causes the picker arms to move with a jerky motion which is sometimes more efficient than an even speed.

From the foregoing description taken in connection with the accompanying drawings, it will be seen that I have provided a very efficient and durable cotton harvester which will operate to effectually pick cotton from the plant and discharge the cotton into receptacles, mounted on the machine.

While I have shown and described the preferred embodiment of my invention, it will be understood that minor changes in construction, combination and arrangment of parts may be made without departing from the spirit and scope of the invention as claimed.

Having thus described my invention, I claim:—

1. In a cotton harvester, the combination, of a sprocket chain, plates carried by said chains, picking arms carried by said plates, movable picking pins carried by said arms for movement into and out of a cotton engaging position, spiders having radiating arms for engaging said chains and moving them into and out of a cotton picking position, means for moving said pins into and out of a cotton picking position, said means being arranged for moving said pins into a cotton picking position when said chain is moved into a cotton picking position, means for stripping the cotton from said arms, cotton retaining casing chutes for conveying the cotton from said stripping means to said casings.

2. In a cotton harvester, the combination, of a sprocket chain, plates carried by said chains, picking arms carried by said plates, movable picking pins carried by said arms for movement into and out of a cotton engaging position, spiders having radiating arms for engaging said chains and moving them into and out of a cotton picking position, means for moving said pins into and out of a cotton picking position, said means being arranged for moving said pins into a cotton picking position when said chain is moved into a cotton picking position.

3. In a cotton harvester, the combination, of a sprocket chain composed of connected spaced links, plates carried by said chain, picking arms carried by said plates and comprising a sleeve having one end closed, a spindle rotatably mounted in said sleeve, collars mounted upon said spindle at spaced intervals along its length, a plurality of pins connected to said collars concentrically about said spindle, said sleeve being provided with openings corresponding to and alined with said pins, means for permitting of a limited movement of said spindle independent of said sleeve for moving said pins into or out of a projecting position through said openings, spiders having radiating arms for engaging said chains and moving them into and out of a cotton picking position, said means being arranged for moving said pins into a projecting position out of said sleeve when said arms are in a cotton picking position, and moving the pins inwardly into the sleeve when the arms are moved out of a cotton picking position, means for stripping the cotton from said arms comprising a plurality of hub sections, radiating arms carried by said hub sections, brushes carried by said arms, cotton retaining casings, chutes for conveying the cotton from the stripping mechanism into said casings.

In testimony whereof I affix my signature in presence of two witnesses.

DANIEL B. LOVEJOY.

Witnesses:
FRANK HESS,
T. H. MOORE.